(12) United States Patent  (10) Patent No.: US 8,272,654 B2
Xie  (45) Date of Patent: Sep. 25, 2012

(54) LOCKING PIN MECHANISM FOR A TRANSPORT SEMI-TRAILER

(75) Inventor: Liangfu Xie, Shenzhen (CN)

(73) Assignee: CIMC Vehicles Group Co., Ltd. (CN)

( * ) Notice: Subject to any disclaimer, the term of this patent is extended or adjusted under 35 U.S.C. 154(b) by 161 days.

(21) Appl. No.: 12/846,061

(22) Filed: Jul. 29, 2010

(65) Prior Publication Data

US 2011/0101638 A1    May 5, 2011

(30) Foreign Application Priority Data

Nov. 2, 2009 (CN) .......................... 2009 1 0209227

(51) Int. Cl.
B62D 53/06 (2006.01)
(52) U.S. Cl. ................... 280/149.2; 280/407.1; 180/209
(58) Field of Classification Search ............... 280/149.2, 280/107, 407.1, 81.1, 405.1, 406.1; 180/209, 180/24.02, 906
See application file for complete search history.

(56) References Cited

U.S. PATENT DOCUMENTS

| | | | |
|---|---|---|---|
| 3,372,946 A | 3/1968 | Hutchens | |
| 4,838,566 A | 6/1989 | Baxter et al. | |
| 5,480,171 A | 1/1996 | Cheffey | |
| 6,213,489 B1 * | 4/2001 | Eckelberry | 280/407.1 |
| 6,435,536 B2 * | 8/2002 | Eckelberry | 280/407.1 |
| 7,261,177 B2 * | 8/2007 | Eckelberry | 180/209 |
| 8,025,302 B2 * | 9/2011 | Saieg et al. | 280/149.2 |
| 2001/0019196 A1 * | 9/2001 | Eckelberry | 280/149.2 |
| 2011/0304116 A1 * | 12/2011 | Saieg et al. | 280/149.2 |

* cited by examiner

*Primary Examiner* — Paul N Dickson
*Assistant Examiner* — Karen A Beck
(74) *Attorney, Agent, or Firm* — Cantor Colburn LLP

(57) ABSTRACT

A locking pin mechanism for a transport semi-trailer, the locking pin mechanism is used for locking longitudinally extending members of a frame of a transport semi-trailer together with a trailer body movably arranged on the longitudinally extending members. The locking pin mechanism comprises at least two bolt assemblies and a linkage assembly for driving the at least two bolt assemblies. The bolt assembly comprises a bolt, an inner spring, a sliding sleeve, an outer spring and a bracket. The sliding sleeve at an end away from its sliding sleeve end-plate is connected with the linkage assembly; the linkage assembly can be pulled such that the sliding sleeve of the bolt assembly is compresses the inner and outer springs to force the bolt to be pulled out from a locating hole under an action of an elastic force of the inner spring; and after the linkage assembly is released, the bolt can be inserted into the locating hole under the action of the elastic force of the outer spring. The locking pin mechanism of the invention provides an improved operability, an excellent reliability and a convenience in operation.

5 Claims, 7 Drawing Sheets

LOCKING PIN MECHANISM FOR A TRANSPORT SEMI-TRAILER

TECHNICAL FIELD

The present invention relates to transport semi-trailers, and more particularly, to a locking pin mechanism for a movable trailer body of a transport semi-trailer.

BACKGROUND

Container transport semi-trailers, while in use, must be in compliance with the relevant regulations and provisions. As for the aspect of cargo load (weight), specifically, they need to meet the requirements of a maximum cargo load limit and an axle-load limit. When a cargo is loaded, the total weight of the cargo is controllable, however, it is difficult to distribute the loaded cargo uniformly. This means that although the total weight of the cargo may be controlled effectively to meet the requirement of the maximum total weight, the non-uniformity of cargo distribution, e.g. the gravity center of the cargo biasing towards the semi-trailer axle/tractor axle, may cause the axle-load of the semi-trailer axle/tractor axle exceed the limit provided by the regulations. On the other hand, in the U.S., the total weight of load and the wheelbase are related, that is, the longer the wheelbase is, the larger the total weight is allowed, furthermore, different states in the U.S. have different provisions for the axle-load limit. Accordingly, the adjustment to the axle-load is achieved by adjusting the trailer body to change the wheelbase, in order to meet the requirement of the axle-load limit.

FIG. 1 illustrates a conventional container transport semi-trailer comprising a frame 1, a suspension 2, an axle 3 and a tractor 4 and so on, while the reference sign 5 indicates the gravity center of the cargo. In order to avoid the axle-load from being overcharged and the total weight from being changed, the most effective way is to adjust the wheelbase 6 of the semi-trailer.

In normal conditions, the position of the semi-trailer axle 3 is fixed, which means the wheelbase 6 is constant, and the suspension in such a condition is directly fixed to longitudinally extending members of the frame. Referring to FIG. 2, in order to make the wheelbase 6 adjustable, generally, the suspension 2 is fixed on a trailer body 8 with pins 10 disposed at front and rear ends of the trailer body 8, and a set of locating-hole plates 9 are fixed on the longitudinally extending members 7 of the frame. Once the trailer body 8 is moved to the desired position, the pins 10 are inserted into corresponding holes in the locating-hole plate 9, and thus the adjustment and fixation of the wheelbase are implemented.

FIGS. 3(a)-3(b) illustrates a prior locking pin mechanism for locking a slidable trailer body and longitudinally extending members of a frame, which is disclosed by U.S. Pat. No. 3,372,946 (published on March, 1968 in the name of Hutchens). The locking pin mechanism comprises a locating-hole plate 9, pins 10, pressure springs 11, a lock case 12, a linkage 13, a shaft 14, a slewing arm 15, a return spring 16 and a pull rod 17. Its operating principle is that in the working position, the pins 10 are pressed into the locating plate holes 9 by the action of the pressure springs 11, and the pull rod 17 is pulled towards left by the action of the return spring 16. At this time, the movable trailer body 8 and the longitudinally extending members 7 are coupled into one piece by the pins 10 and cannot move with respect to each other, that is the working position. When the wheelbase 6 is required to be adjusted, the pull rod 17 is firstly pulled outwardly to drive the slewing arm 15 to rotate counterclockwise, and then the linkage 13 is driven to move inwardly so to pull the pins 10 out of the locating plate holes 9, thus the separation of the trailer bodys 8 and the longitudinally extending members 7 is accomplished. At this time, the trailer bodys can move back and forth longitudinally along the direction of the longitudinally extending members, so as to perform adjustment to the wheelbase. However, in the practical operation, it is difficult for the axles of the pins 10 to be concentric with the centers of the locating plate holes 9, which means that the pins 10 and the locating plate holes 9 get stuck, thus it is difficult to move the pull rod 17 when pulling it outwardly. In order to allow the pins 10 to be pulled out of the locating plate holes 9, a generally accepted method is that one person pulls the pull rod outwards while another person forcibly moves the vehicle back and forth. Once the axles of the pins 10 are concentric with the axles of the locating plate holes 9, that is, the pins and the holes are not getting stucked any more, the pins 10 may be pulled out of the locating plate holes 9 by the action of the pulling force, and thus the separation of the trailer bodys 8 and the longitudinally extending members 7 is performed. In this situation, two persons are necessary for carrying out this operation. After the adjustment of the wheelbase is finished, the pull rod 17 is released by the operator, and pulled to the left by the return spring 16, thereby the slewing arm 15 rotates clockwise and all the linkages 13 protrude outwardly, and the pins 10 are pressed towards the locating plate hole 9 by the pressure springs 11. Generally, it is also difficult for the axles of the adjusted pins 10 to be concentric with the centers of the locating plate holes 9, and the operator also has to forcibly move the vehicle back and forth, till the centerlines of both the pins 10 and the respective locating plate holes 9 substantially align, then the pins 10 is automatically inserted into the locating plate holes 9 due to the action of the pressure springs 11, and in this situation only one operator is needed.

In fact, it is impractical for carrying out the operation with two persons, since in many cases there is only one driver driving the vehicle, and thus the operation typically could only be carried out by a single person. Therefore, improvements to the above-described structure are needed in order to allow the above-described operation to be implemented by only one person.

In view of this problem presented in the above patent, U.S. Pat. No. 4,838,566 (published on June 1989 and assigned to Holland-Binkley Corporation) discloses a structure as shown in FIGS. 4(A)-4(B). An important improvement of this patent is that one torsional spring 18 is provided at an end of the shaft 14, and the function thereof is that if the pins 10 get stuck in the locating plate holes 9 when the pull rod 17 is pulled, the slewing arm 15 is still able to rotate, and at this time, the slewing arm 15 would drive one end of the torsional spring 18 to rotate. After the operator has pulled the pull rod 17 in place completely and fixed them, the operator could then give a push to the semi-trailer to remove the stuck between the pins 10 and the locating plate holes 9, to allow the other end of the torsional spring to rotate, so the pins 10 may be pulled out of the locating plate holes 9. However, the torsional spring 18 is required to have such a rigidity that is sufficient for overcoming both the expansion force of the pressure springs 11 and the resistance of the pins 10, so as to pull the pins 10 out of the locating plate holes 9. Moreover, when the pins get stuck, the pins 10 could be pulled out of the locating plate holes 9 only when the stuck all the pins 10 are released from lock simultaneously. Similarly, after the adjustment of the wheelbase is finished, the operator releases the pull rod 17, each of the pins 10 is pressed towards the respective locating plate hole 9 under the action of the pressure springs 11, and all the pins 10 could be inserted simultaneously only when the axles of these pins 10 are simultaneously aligned with the centers of the locating plate holes 9.

In view of the problems presented in the above patents, a new U.S. Pat. No. 5,480,171 (Published on January 1996 and assigned to Hutchens Industries, Inc.) provides a complete solution, the key thereof is that a new improvement is performed on the locking pin structure. FIG. 5 illustrates the working principle of this patent. Springs 64 of a relative low stiffness coefficient are provided on the inside end of the pins 58, and springs 68 of a relative high stiffness coefficient are provided on the end of linkages 72 adjacent to the locking pins. The springs 64 are restricted at one end by a fixing plate 44, and are restricted at another end by stepped surfaces of inside faces of the pins 58. The springs 64 are always in a compressed state such that a force applied inwardly is produced, and the force pushes the pins 58 inwardly and causes the pins 58 to release from the locating plate holes 18. The function of the spring 68 is to press the pins 58 into the locating plate holes 18, and the pins 58 are also required to overcome the force applied by the springs 64 during pressing, hence the force produced by the springs 68 is required to be great sufficiently. Referring to FIG. 6, when the wheelbase is required to be adjusted, the operator pulls the pull rod 90 outwardly and fixes it to the position 91. The pull rod will drive the slewing arm 82 to rotate. Since the connection plate 78 and the slewing arm 82 are fixed to the shaft, when the slewing arm 82 rotates, the connection plate 78 is driven to rotate, and thus the linkages 72 are pulled to move inwardly. The other end of each of the linkages 72 then compresses the spring 68. If the pins 58 and the locating plate holes 18 are concentric with each other at this moment, the pins 58 will be pushed inwardly under the action of the spring 64, so that the pins 58 are pulled out of the locating plate holes 18, as shown on the left side of FIG. 6. If the pins 58 and the locating plate holes 18 are in the state of stuck condition, tips 70 of the pull rods 72 would separate from tips 66 of the pins 58. The operator would then give a push to the vehicle to make the pins 58 to be concentric with the locating plate holes 18, and push the pins 58 inwardly to exit the locating plate holes 18 with the action of the springs 64. After all the pins 58 have exited the locating plate holes, the operator can adjust the wheelbase. After the adjustment of the wheelbase is finished, the operator will release the pull rod 90, and by this time all the compressed springs 68 push the pins 58 to insert them into the respective locating plate holes 18. If all the axles of the pins 58 are correctly concentric with the center of the locating plate holes 18, the pins 58 would directly enter into the locating plate holes 18, otherwise, the pins 58 would get stuck outside the locating plate holes. At this time, again, the operator would give a push to the vehicle to make the axles of the pins 58 to be concentric with the center of the locating plate holes, and then the pins 58 would enter into the locating plate holes 18, so one adjustment of the wheelbase is completed.

The actions of pulling the pins 58 out of the respective locating plate holes 18 can be performed independently from each other in U.S. Pat. No. 5,480,171, so the operability of this patent is improved greatly in contrast to the U.S. Pat. No. 4,838,556. However, in practical operation, it is very laborious for the operator to pull the pull rod 90 outwardly, because the elastic forces of the springs 68, which are required to be capable of pushing the pins 58 to move while overcoming the force applied by the spring 64, are very big. Furthermore, when the operator releases the pull rod 90, the springs 68 will on the one hand compress the springs 64 and on the other hand push the pins 58 to insert them into the respective locating plate holes 18. In this procedure, if one of the pins 58 runs into obstacle in the procedure of being inserted into the locating plate hole 18, the other pins 58 cannot be inserted into the corresponding locating plate holes 18 either.

Accordingly, it is desirable to provide a locking pin mechanism which has a better operability and reliability, and can be operate easily by the operator.

SUMMARY OF THE INVENTION

Objects of The invention are solving the technique problems with the locking pin mechanism of the transport trailer body in the prior art, such as complex and difficult operation, as well as low reliability.

In order to achieve the above objects, the invention provides a bolt assembly for locking longitudinally extending members of a frame of a transport semi-trailer together with a trailer body movably arranged on the longitudinally extending members. Each of the longitudinally extending members is provided with a locating hole. The longitudinally extending member comprises a bolt, an inner spring, a sliding sleeve, an outer spring and a bracket. The bolt comprises a thick axle portion and a thin axle portion, a step is formed at a position where the thick axle portion and the thin axle portion are joined, and a pin end-plate is fixed at a free end of the thin axle portion; the inner spring is put on the thin axle portion of the bolt; the thin axle portion and the inner spring are accommodated in the sliding sleeve, and an end of the sliding sleeve is provided with a sliding sleeve end-plate which abuts against the step; the outer spring is put on an outer circumference surface of the sliding sleeve; the sliding sleeve and the outer spring are accommodated in the bracket; two ends of the inner spring abut against the pin end-plate and the sliding sleeve end-plate, respectively; and two ends of the outer spring abut against the bracket and the sliding sleeve end-plate, respectively; the bracket is fixed on the trailer body; the sliding sleeve is pulled such that the sliding sleeve end-plate compresses the inner and outer springs to force the bolt to be pulled out from the locating hole under an action of an elastic force of the inner spring; and after the sliding sleeve is released, the bolt is inserted into the locating hole under the action the elastic force of the outer spring.

In order to achieve the above objects, the invention also provides a locking pin mechanism for a transport semi-trailer, the locking pin mechanism comprises at least two above-described bolt assemblies and a linkage assembly for driving the at least two bolt assemblies. The linkage assembly comprises at least one slewing arm, at least two linkages, a shaft, a slewing and a pull rod; the sliding sleeve of each bolt assembly is correspondingly connected to one end of one of the linkages, and the other ends of the two linkages are correspondingly connected to two ends of the slewing arm respectively; the shaft is fixedly connected to each of the slewing arms by passing through a center of each of the slewing arms; one end of the slewing is fixedly connected to the shaft and the other end of the slewing is hinged with one end of the pull rod, and the other free end of the pull rod protrudes from one side of the frame.

In said locking pin mechanism for the transport semi-trailer, a stopper is provided at one end of each said linkage; each sliding sleeve at an end away from its sliding sleeve end-plate is provided with a perforation; and each of the linkage passes through the perforation of each sliding sleeve and is limited onto the sliding sleeve by its upper stopper.

In said locking pin mechanism for the transport-type semi-trailer, the pull rod at a position is near its free end provided with an indentation, and the indentation gets the pull rod itself stuck on the trailer body.

In said locking pin mechanism of the transport semi-trailer, the linkage assembly further comprises an extension spring, one end of the extension spring is connected with the slewing, and the other end of which is connected with a side of the frame away from the pull rod.

The invention can achieve the following beneficial technical effects: since the inner and outer springs function independently from each other, in their compressed states, the inner spring functions to pull the bolt out of the locating hole, and the outer spring functions to insert the bolt into the locating hole; the elastic coefficient required for a single spring is small, when the locking pin mechanism is operating, the pulling force required is small and thus the operation is convenient; furthermore, since the actions of pulling out of or inserting each bolt into the locating hole are performed independently from each other, even if one pin runs into obstacle in the procedure of being inserted into or pulled out of the locating plate hole, it does not interfere with other pins to be inserted into or pulled out of the corresponding locating holes, so that the operability and reliability of the locking pin mechanism are improved.

DETAILED DESCRIPTION OF THE EMBODIMENTS

Hereinafter, the invention will be described in more detail by taking a preferred embodiment as an example, in conjunction with the accompanying drawings.

Figure 1:
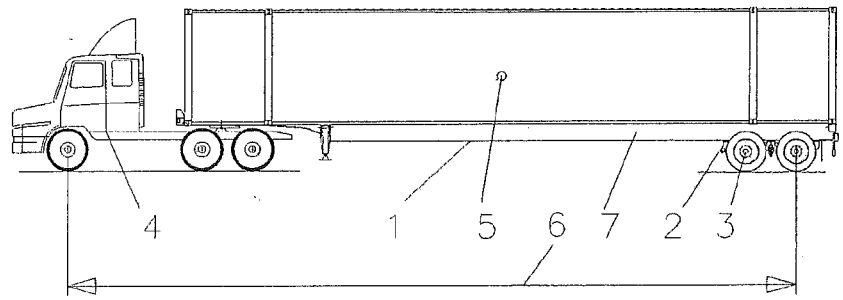
FIG. 1 is a schematic diagram showing a structure of a conventional container transport semi-trailer.
Figure 2:
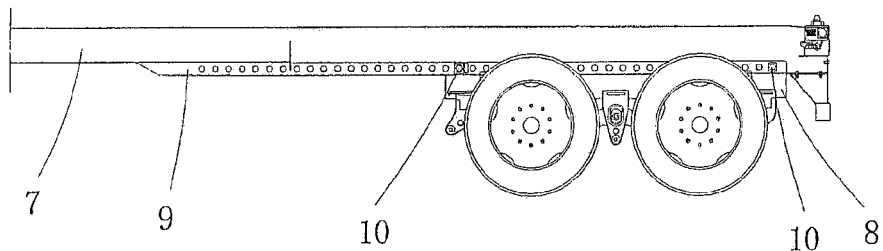
FIG. 2 is a schematic diagram showing a structure of a conventional movable trailer body.
Figure 3:
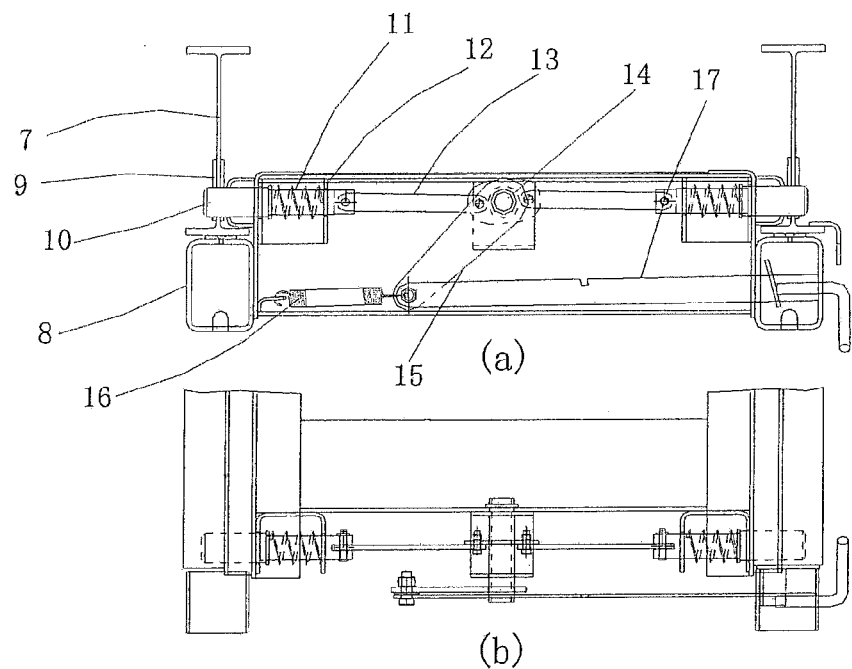
FIGS. 3(a)-3(b) are a schematic diagram showing a structure of a conventional locking pin mechanism for connecting the slidable trailer body with the longitudinally extending members of the frame.
Figure 4:
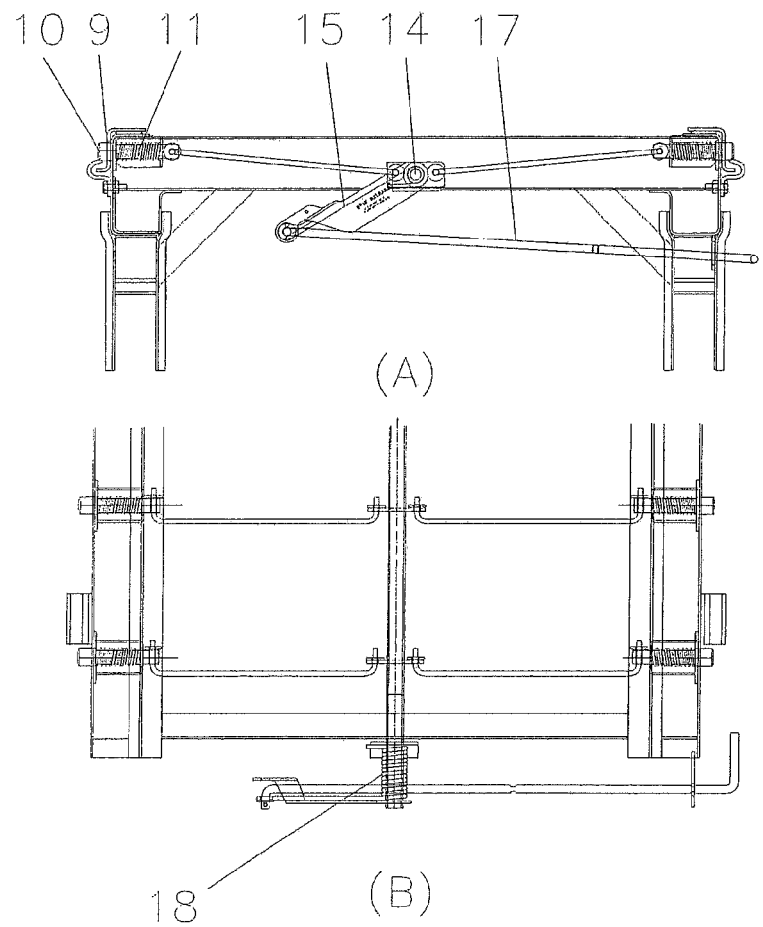
FIGS. 4(A)-4(B) are a schematic diagram showing a structure of the locking pin mechanism of U.S. Pat. No. 4,838,566.
Figure 5:
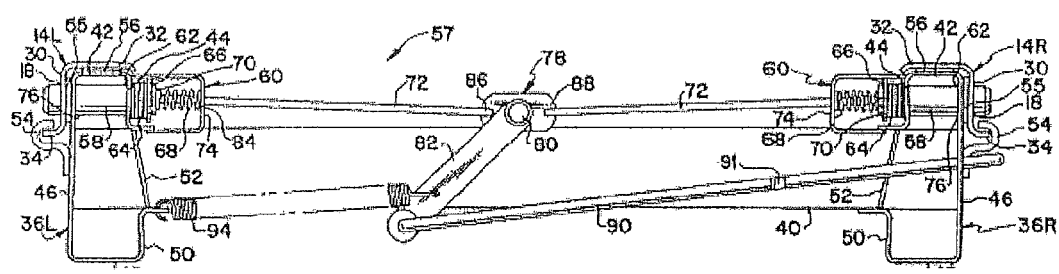
FIG. 5 is a schematic diagram showing a structure of the locking pin mechanism of U.S. Pat. No. 5,480,171, wherein the locking pins are in a locking position.
Figure 6:
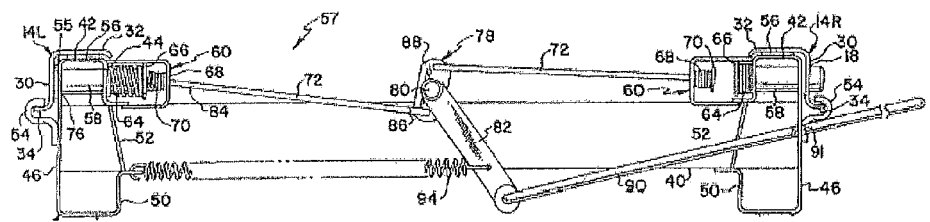
FIG. 6 is a schematic diagram showing a structure of the locking pin mechanism of U.S. Pat. No. 5,480,171, wherein one of the locking pins is released.
Figure 7:
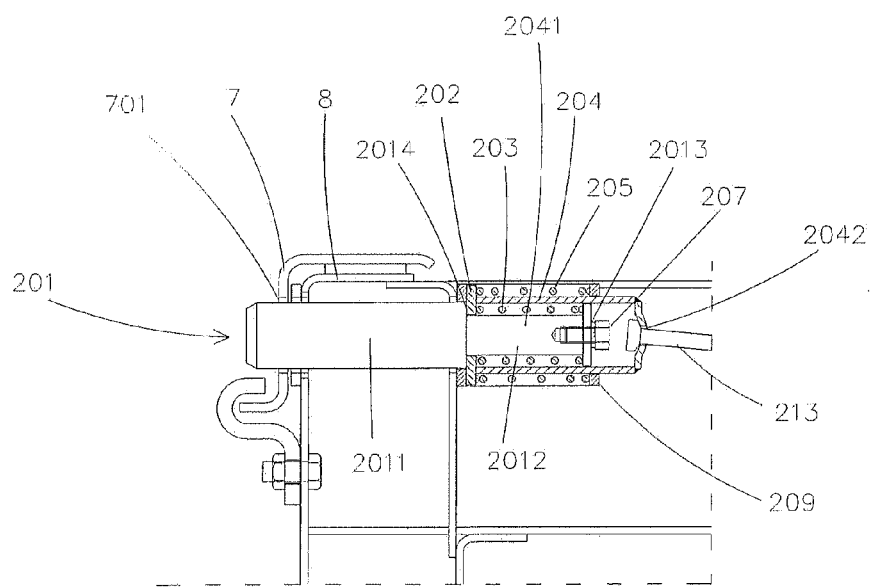
FIG. 7 is a schematic diagram showing a structure of the locking pin mechanism of the invention.
Figure 8:
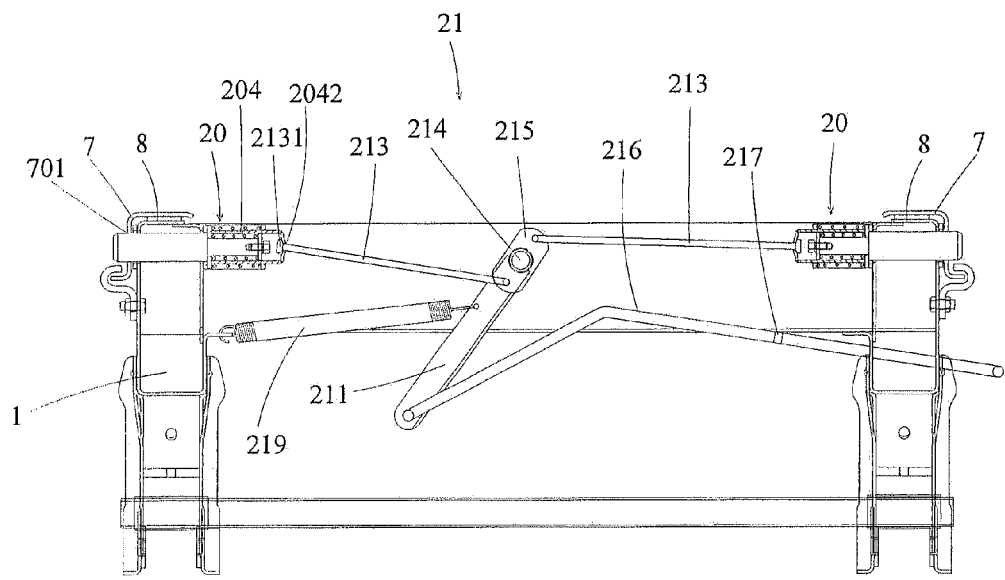
FIG. 8 is a schematic diagram showing a structure of a bolt assembly of the locking pin mechanism.

Referring to FIGS. 7 and 8, the locking pin mechanism in the embodiment comprises two bolt assemblies 20 and a linkage assembly 21 which drives the two bolt assemblies 20 to act, each of the two bolt assemblies 20 is mounted respectively on one of side beams 8 located on both sides of the movable trailer body. A set of locating plates is attached on a longitudinally extending member of a frame or a bottom beam of the frame; a group of locating holes 701 are provided in each of the locating plates 7 (for a semi-trailer with the longitudinally extending member of the frame, the locating holes are provided directly in the longitudinally extending members of the frame; for a semi-trailer without the longitudinally extending members of the frame, side beams containing the locating holes are provided in the bottom beam positioned in the rear of the frame). After the trailer body is moved to a desired position, bolts 201 of the bolt assemblies 20 are inserted into the locating holes 701 of the locating plates 7 of the longitudinally extending members of the frame by the action of the linkage assembly 21 driving the bolt assemblies 20, and thus the adjustment and fixation of an axle wheelbase are accomplished.

Referring to FIG. 7, each bolt assembly 20 comprises a bolt 201, a inner spring 203, a sliding sleeve 204, an outer spring 205 and a bracket 209. The bolts 201 comprises a thick axle portion 2011, a thin axle portion 2012, and a pin end-plate 2013 provided at an end of the thin axle portion 2012. A step 2014 is formed where the thick axle portion 2011 and the thin axle portion 2012 are joined. The pin end-plate 2013 is fixed at the end of the thin axle portion 2012 away from the thick axle portion 2011 by a screw 207. The inner spring 203 is put on the thin axle portion 2012. The sliding sleeve 204 has a configuration of hollow-barrel shape and comprises a receiving chamber 2041 having an opening, a sliding sleeve end-plate 202 is fixed at the opening end of the sliding sleeve 204, and a perforation 2042 for connecting the linkage assembly 21 is provided at the other end of the sliding sleeve away from the opening end. The thin axle portion 2012 and the inner spring 203 are accommodated in the receiving chamber 2041 of the sliding sleeve 204, both ends of the inner spring 203 respectively abut against the pin end-plate 2013 and the sliding sleeve end-plate 202, and the sliding sleeve end-plate 202 can slide on the thin axle portions 2012 of the bolts 201. The bracket 209 is fixed on the side beams 8 located on both sides of the trailer body, a round hole is provided at an axial center of each bracket 209. The sliding sleeve 204 is located and slidable in the round hole. The outer spring 205 is put on the outer circumference surface of the sliding sleeve 204 and located within the bracket 209, and two ends of the outer spring 205 respectively abut against the bracket 209 and the sliding sleeve end-plate 202. The sliding sleeve end-plate 202 abuts against the step 2014 of the bolt 201 under the action of the elastic force of the inner spring 203 and the outer spring 205.

Referring to FIG. 8, the linkage assembly 21 comprises a slewing arm 215, two linkages 213, a shaft 214, a slewing 211 and a pull rod 216. Each of two ends of the slewing arm 215 is hinged to one end of the two linkages 213 respectively, and the other ends of the two linkages 213 pass through the perforations 2042 of the sliding sleeve 204 to connect with the sliding sleeve 204. In order to prevent the linkages 213 from dropping out of the perforation 2042, a stopper 2131 is provided on the end of the linkage 213 that extends into the sliding sleeve 204. The shaft 214 passes through the center of the slewing arm 215 to be fixed on the slewing arm 215. One end of the slewing 211 is fixedly connected with the shaft 214, and the other end of the slewing 211 is hinged with one end of the pull rod 216. The other end of the pull rod 216 is a free end that protrudes from one side of the frame 1, and the pull rod 216 is provided with an indentation 217 at the position near the free end, with the indentation 217 the pull rod itself can be clasped on the side beam 8 of the trailer body.

Moreover, the linkage assembly 21 further comprises an extension spring 219 which forces the slewing 211 to return to its initial position. One end of the extension spring 219 is connected with the slewing 211 and the other end is connected with the side of the frame 1 away from the pull rod 216. Once the slewing 211 is not subjected to the external force, the slewing 211 would return to its initial position under the action of the elastic force of the extension spring 219.

Apparently, the number of the bolt assemblies 20 can be two or more in practical application, and correspondingly, the numbers of the linkages 213 connecting the bolt assemblies 20 and the slewing arms 215 connecting the linkages 213 can also be two or more. Typically, the number of the bolt assembly 20 is an even number. Each of the bolt assembly 20 is correspondingly connected to one linkages 213, every two linkages 213 are correspondingly connected to one slewing arm 215, and each of the slewing arms 215 is attached on one shaft 214. Specifically, the shaft 214 passes through the center of each slewing arm 215 to be fixedly connected with each slewing arm 215. When the shaft 214 rotates, each of the slewing arms 215 rotates following the rotation of the shaft 214.

Figure 9:
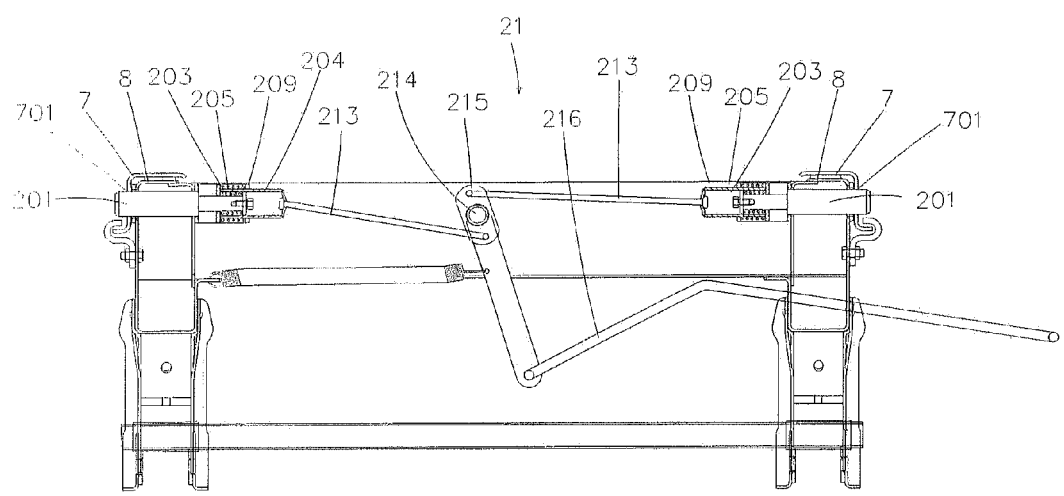
FIG. 9 is a schematic diagram showing the structure of the locking pin mechanism when the pins are in a pre-pull position.
Figure 10:
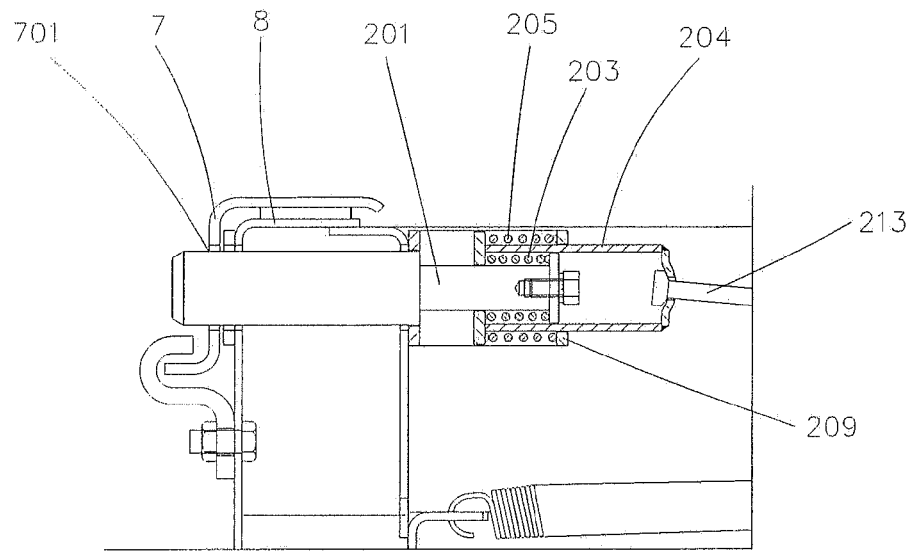
FIG. 10 is an enlarged diagram showing the structure of the bolt assembly of FIG. 9.
Figure 11:
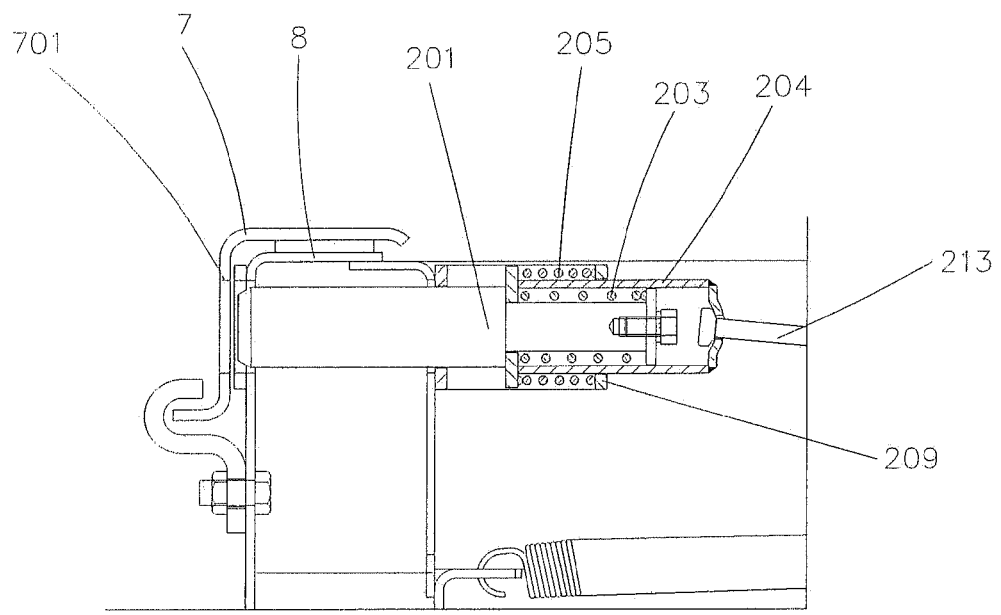
FIG. 11 is a schematic diagram showing the structure of the bolt assembly of the locking pin mechanism when the bolt is in a pull-out position.

The working principle of the locking pin mechanism according to the embodiment is as follows:

Referring to FIGS. 9-11, when the wheelbase is required to be adjusted, the pull rod 216 can be pulled outwardly, and then the indentation 217 of the pull rod 216 can be clasped on the side beam 8 of the trailer body. At this time, the pull rod 216 will drive the shaft 214 and the slewing arm 215 to rotate counterclockwise, and the slewing arm 215 will drive the linkages 213 to move inwardly, while the other end of the linkages 213 will drive the sliding sleeve 204 of the bolt assembly to move inwardly, so as to pull the bolts 201 out of the locating holes 701, thus the separation of the trailer bodys and the frame longitudinally extending members is accomplished. At this time, the trailer bodys can move back and forth longitudinally along the direction of the longitudinally extending members to realize the adjustment of the wheelbase. In practical operation, it is difficult for the axle of the bolts 201 to be concentric with the centers of the locating holes 701, which means that the bolts 201 and the locating holes 701 get stuck. If the bolts 201 and the locating holes 701 are now in getting a stuck condition, referring to FIG. 9, the bolts 201 would be immobile, and the sliding sleeve end-plate 202 would compress the inner spring 203 and the outer spring 205, at this time, the locking pin mechanism is in a pre-pull position. Referring to FIG. 10, which is an enlarged diagram showing the structure of the bolt assembly 20 of FIG. 9, when the bolts 201 are in the pre-pull position, both the inner spring 203 and the outer spring 205 are in the compressed state, and the inner spring 203 will exert an extension force to force the bolts 201 to move inwardly, i.e. the bolts 201 have the tendency of being pulled out inwardly. If the driver gives a push to the vehicle at this time to make the bolts 201 to be concentric with the locating holes 701, the getting stuck condition between the bolts 201 and the locating holes 701 will be removed, and the bolts 201 will be pulled out of the locating holes 701 under the action of the inner spring 203. At this time, the driver can move the trailer body to perform the adjustment of the wheelbase.

Figure 12:
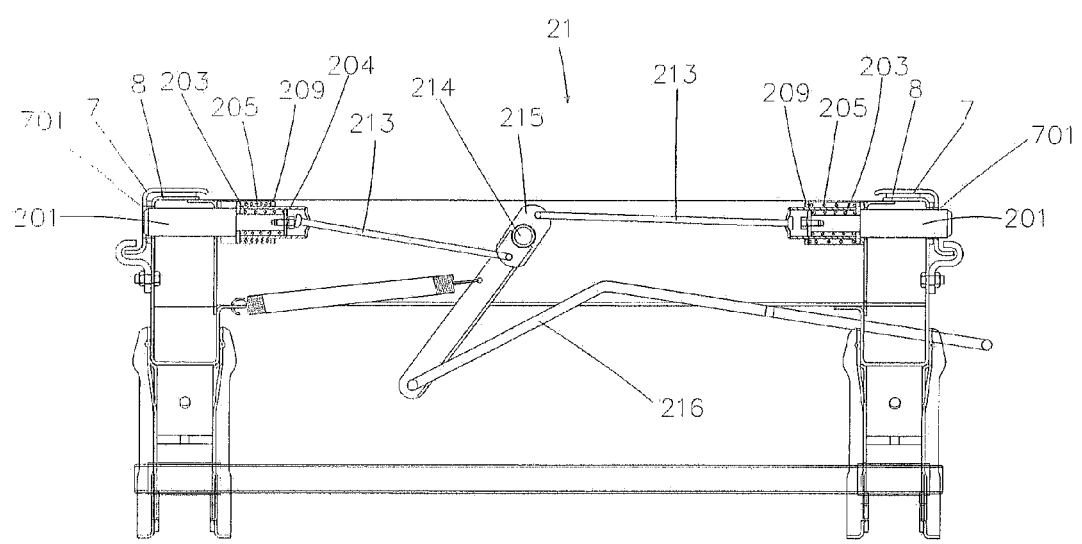
FIG. 12 is a schematic diagram showing the structure of the bolt assembly of the locking pin mechanism when the bolt assembly is in a locked state.

After the movable trailer body is adjusted to the desired position, the driver may release the pull rod 216 from the side beam 8 of the trailer body. Referring to FIG. 12, at this time the slewing arm 215 rotates clockwise under the action of the extension spring 219, and each of the linkages 213 is in a loose state, at this time, the bolts 201 are pushed towards the locating holes 701 under the action of the outer spring 205. If the bolts 201 and the locating holes 701 are in a concentric position, the bolts 201 would be directly inserted into the locating holes 701 (as the situation shown on the right side of FIG. 12). If the bolts 201 and the locating holes 701 are in a eccentric position, the bolts 201 would be pressed against the edge of the locating holes 701 (as shown on the left side of FIG. 12). After the driver gives a push to the vehicle, the bolts 201 will be concentric with the locating holes 701, at this time, the bolts 201 are inserted into the locating holes 701, so as to lock the trailer body.

It thus can be seen that the functions of the inner spring 203 and the outer spring 205 are independent from each other. When the inner spring 203 and the outer spring 205 are in a compressed state, the function of the inner spring 203 is to pull the bolts 201 out of the locating holes 701, and the function of the outer spring 205 is to insert the bolts 201 into the locating holes 701. The elastic coefficient required for a single spring is relative low, therefore, only a small pull is required to drive the pull rod 216 to move when the locking pin mechanism is operated. Furthermore, the actions of pulling the bolts 201 out of or inserting the bolts into the locating holes can be performed independently from each other, therefore, even if one pin 201 runs into obstacle in the procedure of being inserted into or pulled out of the locating plate holes 701, it does not influence other pins 201 to be inserted into or pulled out of the corresponding locating holes 701, so that the operability of the locking pin mechanism is improved.

For a clearer understanding of the technique effects of the invention, the invention is now compared with the U.S. Pat. No. 5,480,171 and U.S. Pat. No. 5,480,171 as follows:

TABLE 1

| | Relationship and Force of the Two Springs |
|---|---|
| U.S. Pat. No. 4,838,566 | connected in series, the torsion spring having a higher stiffness compresses the spring on the pin in the procedure of pulling the pins |
| U.S. Pat. No. 5,480,171 | connected in series, the torsion spring having a higher stiffness compresses the spring on the pin in the procedure of pulling the pins |
| The invention | connected in parallel; and the two springs act independently from each other in the procedure of pulling and inserting the bolts (pins) |

TABLE 2

| | Force of the Spring Having Higher Stiffness |
|---|---|
| U.S. Pat. No. 4,838,566 | The force of the torsion spring is bigger |
| U.S. Pat. No. 5,480,171 | The force of the higher stiffness spring (bigger spring) is bigger |
| The invention | The forces of both the two springs are small |

TABLE 3

| | Force of Springs on Pin/Bolt |
|---|---|
| U.S. Pat. No. 4,838,566 | Always puts the bolts in inserted position |
| U.S. Pat. No. 5,480,171 | Always puts the bolts in pulled out position |
| The invention | The outer spring always puts a bolt in inserted position, and the compressed inner spring puts another bolt in pulled out position |

TABLE 4

|  | The procedure of inserting and retreating of pins (bolts) |
| --- | --- |
| U.S. Pat. No. 4,838,566 | Both inserting and retreating of all pins have to be performed simultaneously |
| U.S. Pat. No. 5,480,171 | Retreating is performed independently, while inserting has to be performed simultaneously |
| The invention | Both inserting and retreating are performed independently |

It should be appreciated that, although the locking pin mechanism of the above embodiments are directed to solve the problem with locking of the movable trailer body of a semi-trailer, the locking pin mechanism provided by the invention can also be applied to similar lockup structures of other kinds of vehicles.

The forgoing description is, however, merely concerning a preferred practical embodiment of the invention, which is naturally not intent to limit the protection scope of the invention. Accordingly, all the equivalent structures and variations made using the principle of the invention are within the scope of the invention.

What is claimed is:

1. A bolt assembly for locking longitudinally extending members of a frame of a transport semi-trailer together with a trailer body movably arranged on the longitudinally extending members, each of the longitudinally extending members being provided with a locating hole, wherein:

the bolt assembly comprises a bolt, an inner spring, a sliding sleeve, an outer spring and a bracket; the bolt comprises a thick axle portion and a thin axle portion; a step is formed at a position where the thick axle portion and the thin axle portion are joined, and a pin end-plate is fixed at a free end of the thin axle portion; the inner spring is put on the thin axle portion of the bolt; the thin axle portion and the inner spring are accommodated in the sliding sleeve, and an end of the sliding sleeve is provided with a sliding sleeve end-plate which abuts against the step; the outer spring is put on an outer circumference surface of the sliding sleeve; the sliding sleeve and the outer spring are accommodated in the bracket; two ends of the inner spring abut against the pin end-plate and the sliding sleeve end-plate, respectively; and two ends of the outer spring abut against the bracket and the sliding sleeve end-plate, respectively; the bracket is fixed on the trailer body;

the sliding sleeve is pulled such that the sliding sleeve end-plate compresses the inner and outer springs to force the bolt to be pulled out from the locating hole under an action of an elastic force of the inner spring, and after the sliding sleeve is released, the bolt is inserted into the locating hole under the action the elastic force of the outer spring.

2. A locking pin mechanism for a transport semi-trailer, wherein, the locking pin mechanism comprises at least two bolt assemblies according to claim 1 and a linkage assembly for driving the at least two bolt assemblies; the linkage assembly comprises at least one slewing arm, at least two linkages, a shaft, a slewing and a pull rod; the sliding sleeve of each of the bolt assemblies is correspondingly connected to one end of one of the linkages, the other ends of two of the linkages are correspondingly connected to two ends of the slewing arm respectively; the shaft is fixedly connected to each of the slewing arms by passing through a center of each of the slewing arms; one end of the slewing is fixedly connected to the shaft and the other end of the slewing is hinged with one end of the pull rod, and the other free end of the pull rod protrudes from one side of the frame.

3. The locking pin mechanism for a transport semi-trailer according to claim 2, wherein, a stopper is provided at one end of each of the linkages; each sliding sleeve at an end thereof away from its sliding sleeve end-plate is provided with a perforation; and each of the linkages passes through the perforation of each sliding sleeve and is limited onto the sliding sleeve by its stopper.

4. The locking pin mechanism for a transport semi-trailer according to claim 2, wherein, the pull rod at a position near its free end is provided with an indentation for getting the pull rod itself stuck on the trailer body.

5. The locking pin mechanism for a transport semi-trailer according to claim 2, wherein, the linkage assembly further comprises an extension spring, one end of the extension spring is connected with the slewing, and the other end of the extension spring is connected with a side of the frame away from the pull rod.

* * * * *